A. W. LISSAUER.
PRESSURE REGULATOR.
APPLICATION FILED MAR. 10, 1922.
1,427,112.
Patented Aug. 29, 1922.
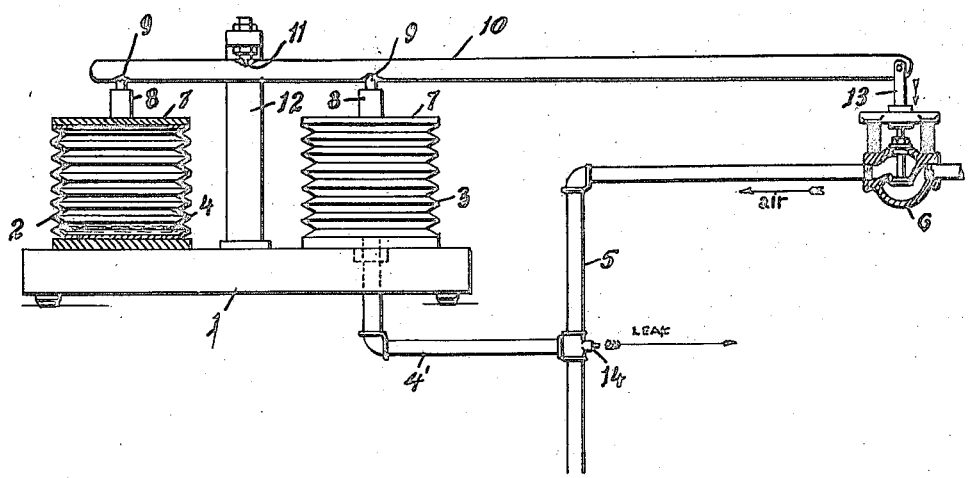
INVENTOR
A.W. LISSAUER
BY
ATTORNEY

UNITED STATES PATENT OFFICE.

ADOLPH W. LISSAUER, OF NORTH TARRYTOWN, NEW YORK, ASSIGNOR TO W. L. FLEISHER & CO., INC., OF NEW YORK, N. Y., A CORPORATION OF NEW YORK.

PRESSURE REGULATOR.

1,427,112. Specification of Letters Patent. Patented Aug. 29, 1922.

Application filed March 10, 1922. Serial No. 542,595.

*To all whom it may concern:*

Be it known that I, ADOLPH W. LISSAUER, a citizen of the United States, and a resident of the town of North Tarrytown, county of Westchester, State of New York, have invented a new Pressure Regulator, of which the following is a full, clear, and exact description.

My invention relates to fluid pressure regulators affected by change in temperature, and whose operation is synchronized with the fluid pressure which they control.

This type of pressure regulator is particularly adaptable for use in controlling the valve or valves supplying fluid by proportioning the extent of the valve opening and closing relatively to the temperature surrounding the pressure regulator.

The device is particularly suitable for controlling the flow of air to thermostats of air conditioning apparatus but is by no means limited to that field.

The object of my invention is to provide a simple, inexpensive and effective device of the class described, having expansible vessels carrying substances adapted to be affected by temperature changes, with motion transmission means from the expansible vessels to operate a predetermined device, such for example as controlling the flow of fluid, one form of which is illustrated in the drawing appended to the specification, and in which 1 is a suitable base on which bellows 2 and 3 are mounted. The bellows 2 receive a volatile liquid 4, such for example as sulphur dioxide $SO_2$, while the bellows 3 are connected by a conduit 4' to the air line 5, on which a valve 6 is provided which controls the flow of air to the conduits 5 and 4'. The bellows 2 and 3 each have a rigid platform 7 at the top, from each of which platforms a stem 8 extends and terminates with a bearing point 9 for a lever 10, the fulcrum point of which lever is at 11 as shown. The fulcrum point 11 of the lever is mounted on a post 12 rising from the base 1. The lever 10 extends to engage the stem 13 of the valve 6.

A change in temperature about the bellows will cause either the condensation or evaporation of the liquid in the bellows 2. Assuming that there is an increase of temperature there will be an increase of pressure in bellows 2 and therefore the tendency of the bellows 2 would be to expand and tend to move the valves 6 in open position. This will necessarily increase the flow of air through the conduits 5 and 4'. This increase of pressure in the bellows 3 will tend to expand the bellows 3, in consequence of which the lever 10 will have a tendency to close the valves 6. These two pressures will equalize each other and the position of the stem 13 will be such that the pressure of the air entering the conduit 5 will exactly equal the pressure of the volatile liquid in bellows 2, if the platforms 7 and the distances between 8 and 11 are equal. On the other hand, assuming that there is a decrease in the temperature and the valve 6 is partially open, the bellows 2 will contract, in consequence there will be a tendency for the valve 6 to close. The closing of the valves 6 cuts off the supply of air to the bellows 3 for there is always an air leak as shown at 14 in the conduit 5, and contraction of the bellows 3 will cause the lever to operate the valve 6 so as to open and tend to increase the air pressure in the conduit. The two bellows will equalize and the pressure in the conduit 5 will again be exactly equal to the pressure in bellows 2.

This type of apparatus is particularly suited to use liquefied $SO_2$, because, for each change of a degree of temperature surrounding a container of that material, there is a change of about one pound pressure per square inch. This figure, of course, is approximate, for the changes in pressures are not exactly proportionate to the changes in temperature at the lower and higher registers; however, for customary temperatures the proportion is exact enough.

It is self evident that the fulcrum distances of the lever 10 and the bellows 2 and 3 may be so arranged that a predetermined ratio of the leverage between the bellows can be obtained; or, if desired, the diameter of the bellows may be varied to obtain a differentiated pressure with the fulcrum distances of the bellows and lever remaining equal as shown in the drawing.

I claim:

1. An apparatus of the class described, comprising a pair of expansible vessels, disposed to be subjected to the same temperature changes, one of the vessels being adapted to enclose a volatile liquid, a conduit connected to the other vessel, a valve on said conduit, means for permitting a constant leak from said conduit between the second mentioned vessel and the valve, and motion transmission means from the vessels to the valve, substantially as and for the purposes set forth.

2. An apparatus of the class described, comprising a pair of expansible vessels, disposed to be subjected to the same temperature changes, one of the vessels being adapted to enclose a volatile liquid, means of controlling a flow of compressible fluid to said second vessel, and motion transmission means from said vessels to said controlling means, substantially as and for the purposes set forth.

3. An apparatus of the class described, comprising a pair of sealed bellows, one adapted to enclose a volatile liquid, a conduit connected to the other bellows, a valve on said conduit, means for providing a constant air leak in said conduit between the second mentioned bellows and the valve, and means for transmitting the motion from the bellows to the valve so that the two bellows are adapted to counteract each other.

4. An apparatus of the class described, comprising a pair of sealed bellows, one adapted to enclose a volatile liquid, a conduit connected to the other bellows, a valve on said conduit, a constant air leak in said conduit between the second mentioned bellows and the valve and a lever for operating the valve and connecting to said bellows so that the action of the bellows are such that one counteracts the other, substantially as and for the purposes set forth.

5. An apparatus of the class described, comprising sealed bellows adapted to enclose a volatile liquid, a second bellows, a conduit connected to said second bellows, a valve on said conduit, means for a constant air leak on said conduit between the said second bellows and the valve, a fulcrumed lever operatively connected to the valve and extending to the bellows, and means from the bellows to the lever engaging pivotally the said lever between the fulcrum of said lever, substantially as and for the purposes set forth.

ADOLPH W. LISSAUER.